Oct. 25, 1966 L. R. LEARNER 3,281,541

TOUCH SENSITIVE TELEPHONE CALLING APPARATUS

Filed May 13, 1963

INVENTOR.
LEONARD R. LEARNER

BY Arthur H. Seidel

ATTORNEY

United States Patent Office 3,281,541
Patented Oct. 25, 1966

3,281,541

TOUCH SENSITIVE TELEPHONE CALLING APPARATUS

Leonard R. Learner, Philadelphia, Pa.
(700 Summer St., Stamford, Conn.)

Filed May 13, 1963, Ser. No. 279,737
5 Claims. (Cl. 179—90)

Figure 1:
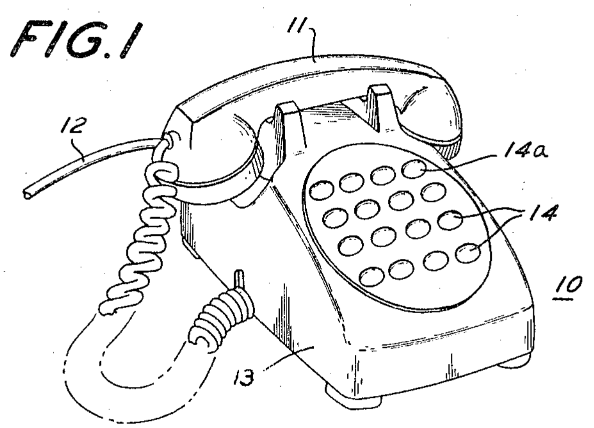

In general, this invention relates to a new and improved telephone calling apparatus which is less time consuming, easier to operate, and which can be more conveniently used by all people, particularly the aged and the handicapped. More particularly, this invention relates to a telephone handset, the calling mechanism of which is sensitive to and responds to the touch of the user. By the utilization of a touch mechanism, calls can be made faster, with less effort, and in a more modern manner. This touch calling mechansm can be sealed so that it can be repaired by merely replacing one sealed unit for another.

In the past, the telephone subscribed placed a telephone call by rotating a mechanical dial or pressing pushbuttons mounted so as to operate contacts and determine any of a plurality of combinations of frequencies necessary to perform the switching functions of the calling apparatus. These mechanical devices had many disadvantages. For example, the dial phone required a given amount of torque to be applied and, as handsets became lighter in weight, this torque was sufficient to move the handset during dialing. Such movement would necessitate the holding of the handset with one hand while dialing with the other on the part of the subcriber. This certainly was not desirable.

With the pushbuttons, it became necessary to provide a plurality of mechanical switches whose contacts would wear, and which created a bulky unit. Furthermore, with pushbuttons, there was no indication given to the subscriber as to whether the button was pressed far enough so as to make the desired contact. The pushbuttons also required a certain amount of pressure to operate them. For handicapped persons, even this small effort would require an exertion beyond their capabilities. Still further, a pushbutton calling mechanism could not be dialed silently without disturbing others.

The mechanical devices discussed above could not be utilized in a sealed unit and thus, dust would accumulate in the handset limiting the useful life of the unit. This dust would cause jamming of the unit and consequent misapplication of telephone signals. The mechanical devices further limited the minimum weight and size of the unit and miniaturization was not possible. Still further, the outward appearance of the mechanical devices on the face of the dial of the handset detracted from its outward appearance and limited its place in the modern decorative scheme.

Therefore, it is the general object of this invention to avoid and overcome the foregoing and other difficulties of the prior art practices by the provision of a new and improved telephone calling apparatus.

Another object is the provision of a new and better touch-type dial for a telephone handset which is fast, silent, convenient, and requires a minimum amount of effort to operate.

Still another object of this invention is to achieve a telephone calling mechanism which is modern in appearance, has no moving parts, and is light in weight.

A further object of this invention is the provision of a better subscriber calling apparatus which indicates to the subscriber the completion of a circuit for the particular number dialed.

Still another object of this invention is to achieve a calling mechanism for a telephone handset which can be utilized in a sealed case.

A still further object of this invention is to provide a new and better telephone calling mechanism which requires less repair, and is capable of being replaced by a similar sealed unit should repair become necessary.

Other objects will appear hereinafter.

The objects of the present invention are accomplished by the utilization of a unique electronic touch sensitive subscriber calling system. Utilizing the calling apparatus of the present invention, a person need only touch out his desired number. This requires a minimum of effort and can be accomplished in a faster and more convenient manner. The calling apparatus itself is faster than any dial system which must operate by first turning the dial and then waiting for the dial to return to its initial position after a number has been selected. Also, the speed of a pushbutton system is limited by the time required for pressing, and releasing each button. The calling apparatus of the present invention rectifies these time limitations. In this novel system, a person need only touch out his number and can immediately select the next succeding number he wishes to touch. The system may also incorporate indicators, such as lights, under each touch plate to indicate the receipt of his signal by the telephone utilization apparatus. Thus, the user can touch out his number as fast as it can be received by the telephone utilization apparatus.

As each number is touched, and the particular switch connection is made, a light can be provided to light under the selected number indicating to the susbcriber that a circuit has been completed for this number. The system is also convertible into one in which all of the numbers on the dial are originally lit and the touch of a number shuts off the particular light indicating that the circuit has been completed. In this last-mentioned embodiment, the telephone is most useful for nighttime use wherein the numbers and letters on the dial will light up so as to provide a separate source of light for the user.

The touch plates of the present invention have been shown as capacitor switches which have no moving parts and can be constructed wholly of static elements eliminating the need for openings in the calling apparatus casing and, therefore, allowing more modern designs to be achieved. The touch plates can be placed in the plane of the surface of the calling apparatus casing or even recessed, if desired. Since only static elements are utilized, the minimum weight of the calling mechanism is dependent only upon the miniaturization of the static elements forming the switch. With the advances made in semiconductor technology, this weight can be substantially lessened to a minimum far less than that presently foreseeable with mechanical switches. Further, the calling mechanism would also be smaller and take less space. By taking less space, the calling mechanism would have greater utility on table-tops, desk-tops, and walls.

For the purpose of illustrating the invention, there is shown in the drawings a form which is presently preferred; it being understood, however, that this invention is not limited to the precise arrangements and instrumentalities shown.

In FIGURE 1, there is shown a telephone handset built in accordance with the principles of the present invention.

Figure 2:
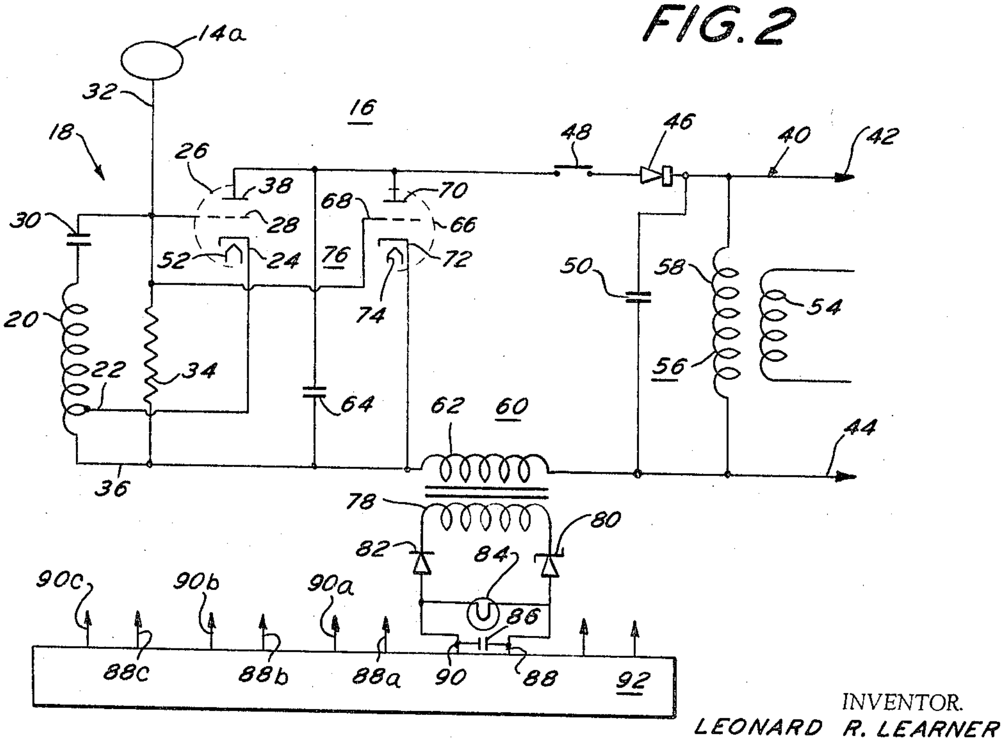

FIGURE 2 is a schematic showing of the circuitry for the handset of FIGURE 1.

In FIGURE 1, the telephone handset generally designated by the numeral 10 includes a handpiece 11, line cord 12, and calling mechanism 13. The calling mechanism 13 employs an array of sixteen touch plates 14, ten plates for the normal digits utilized in making phone calls, and six additional plates which may be utilized for future telephone services or may be omitted. The extra plates can be especially useful in selling additional services of the telephone company such as time, weather, sports, news, and other information.

In FIGURE 2, one of the touch plates 14 has been designated by the numeral 14a and the operation of this touch plate is more clearly disclosed therein. The touch plate 14a controls a separate circuit 16 associated therewith. The circuit 16 comprises an electronic device 18 which is responsive to the application of body capacitance to the touch plate 14a. The touch plate 14a is formed of a transparent plastic material which has coated on one surface thereof a transparent electrically conducting material or, in the alternative, may include an electrically conducting ring about the periphery of the plate.

As illustrated, the electronic device 18 assumes the form of an oscillator comprising a self-resonant coil 20 which is tuned to a predetermined radio frequency by its own distributed capacitance and the capacitance of the circuit connected to the coil. The coil 20 is provided with a tap 22 connected to the cathode 24 of a triode 26 or other electron discharge tube. The triode 26 includes a grid 28 which is connected to one end lead of the coil 20 through a current limiting grid coupling capacitor 30 having a value comparable to the interelectrode capacitances of the triode 26. The touch plate 14a is also connected through a lead 32 to the grid 28 of the triode 26. The lead 32 may be connected to the conducting portion of the plate 14a in any standard manner.

A grid biasing resistor 34 is connected between the grid 28 and the opposite end lead 36 of the coil 20.

The tube 26 is provided with an anode 38 which is energized by a power supply 40. The power supply 40 is connected to a pair of power lines 42 and 44 representing a source of alternating current at 110 volts. In this instance, a half wave rectifier 46 is connected between the power line 42 and the anode 38, in series with a switch 48. The switch 48 is normally open and is closed by the lifting of the handpiece 11 by the subscriber. Thus, anode voltage is not applied to the tube 26 except when the handpiece 11 is lifted. A filtering capacitor 50 is placed across the power lines in a standard fashion.

The triode 26 is equipped with a heater 52 which may be connected to the secondary winding 54 of a heater transformer 56. The primary winding 58 of the transformer 56 is connected directly across the power lines 42 and 44 and does not depend for its energization upon the closing of the switch 48. Thus, the heater for the triode 26 is always energized, assuring that when the switch 48 is closed, the triode 26 will be immediately operative.

In the illustrated construction, a current transformer 60 has been provided having its primary connected in series with the anode power supply 40. More specifically, the primary winding 62 of the transformer 60 is connected between the lines 44 and the line 36 extending to the coil 20 and thence to the cathode 24 of the triode 26. A bypass capacitor 64 is connected between the anode 38 and the lead 36.

In order to amplify the current variations in the tube 26, the control mechanism 16 is provided with a second tube 66 having a grid 68 and an anode 70 connected to the grid 28 and anode 38, respectively, of the tube 26. The tube 66 also includes a cathode 72 connected directly to the lead 36, together with a heater 74 connected to the heater transformer secondary 54. As indicated in FIGURE 2, the triodes 26 and 66 constitute twin elements of a double triode tube 76.

The current transformer 60 has the secondary pickup winding 78 which has a Zener diode 80 in series with one end thereof and a half wave rectifier 82 in series with the other end thereof. The Zener diode 80 and half wave rectifier 82 have an incandescent lamp 84 connected across the terminals thereof. The Zener diode 80 and half wave rectifier 82 insure that only signals greater than a given magnitude having a given polarity will be transmitted to the lamp 84. The lamp 84 is in parallel circuit relation with a capacitor 86.

The lamp 84 and capacitor 86 are across the output leads 88 and 90 of the Zener diode 80 and half wave rectifier 82 respectively. These output leads 88 and 90 are connected to a switching circuit 92 for the handset. When a signal is received across the leads 88 and 90, a dial pulse is transmitted, a switch is closed, or in any other standard manner a signal is received by the utilization circuit 92 and utilized in accordance with the particular touch plate 14a which has been touched by the subscriber.

To control the energization of the leads 88 and 90 in response to energization and deenergization of the primary winding 62, the Zener diode 80 and transformer 60 are utilized to isolate leads 88 and 90 from low value electrical signals received by secondary winding 78. When a signal great enough to break down the Zener diode 80 is received, capacitor 86 is charged and lamp 84 is lit. Lamp 84 is placed immediately below the touch plate 14a so that the subscriber knows when a signal has been applied to leads 88 and 90. So long as lamp 84 is lit, there will be enough time for the signal to be applied to the utilization circuit 92. The capacitor 88 stores the signal received between lines 88 and 90 very quickly but discharges it more slowly due to the high resistance discharge path through the lamp 84.

In operation, the power lines 42 and 44 are continously energized with alternating current. These power lines are connected to power line 12 illustrated in FIGURE 1. Thus, the heaters 52 and 74 are continuously energized from the secondary winding 54 of the heater transformer 56. As a result, when the handpiece 11 is lifted closing switch 48, an anode supply voltage is developed which energizes triodes 66 and 68 immediately. In the absence of body capacitance, the oscillator 18 oscillates continuously by virtue of the feedback provided by the connection of the cathode 24 to the tap 22 on the coil 20. With the tube 26 oscillating, a substantial grid biasing voltage develops across the resistor 34. As a result, the current between the anodes and cathodes of triodes 26 and 66 is maintained at small values. The sum of these currents passing through the primary winding 62 of transformer 60 is insufficient to develop a voltage necessary to break down the Zener diode 80. Therefore, lamp 84 is not lit and no signal is transmitted to the utilization circuit 92.

When a subscriber places his finger on the touch plate 14a,the effect is to increase the capacitance between the electrode embedded in the touch plate 14a and ground. Since the power lines 42 and 44 are substantially at ground potential for radio frequency currents, this added capacitance is effectively applied between the grid 28 of the tube 26 and the lead 36. Because of the current limiting or voltage dividing action of the grid coupling capacitor 30, increasing the grid to ground capacitance tends to reduce the radio frequency voltage on the grid 28 to a level comparable to that on the cathode 24.

In other words, the application of body capacitance to the touch plate 14a reduces the grid to ground impedance relative to the impedance of the capacitor 30 with the result that the radio frequency grid voltage tends to be correspondingly reduced. Under these conditions, the oscillations in the oscillator 18 are stopped. As a result, the grid bias across the resistor 34 drops substantially to zero. Accordingly, the combined cathode currents passing through the primary winding 62 of current transformer 60 increase to a value sufficient to raise the voltage on the secondary winding 78 to a value capable of breaking down the Zener diode 80 and passing current to the lines 88 and 90. Capacitor 88 will charge immediately due to the low time constant of the circuit including the secondary winding 78.

If the subscriber's finger is removed from touch plate 14*a*, oscillator 18 resumes oscillation and the signal from transformer 60 is against insufficient to break down the Zener diode 80. However, capacitor 88, having been charged by the initial surge, will discharge through the lamp 84 and utilization circuit 92. Thus, there will always be a signal of sufficient time duration to energize the utilization circuit 92 in accordance with the touch plate 14*a*.

Additionally, the lamp 84 will light under the touch plate 14*a* to indicate to the subscriber that his signal has been received by the utilization circuit. Further, when the lamp 84 goes out, he knows that he can press another touch plate. This all takes place very, very rapidly so that the subscriber can quickly touch out his telephone number.

The other touch plates 14 are connected to the utilization circuit 92 by pairs of conductors 88*a*, 90*a*; 88*b*, 90*b*; 88*c*, 90*c*; etc., which pairs are exactly similar to the pair 88 and 90 discussed previously. Each touch plate on the dial of the phone is connected to conductors 42 and 44 and has the same control circuit 16 as every other touch plate. Further, the heater coils 52 and 74 of each triode 26 and 66 in the touch plate circuit are connected to the heater transformer 54.

It is within the contemplation of the teachings of the present invention that the lamp 84 could be placed in the circuit of the grid bias resistor 34 so that the lamps under the plates could be initially lit when the handpiece is lifted from its cradle, with the touching of a touch plate turning off the particular lamp until the utilization circuit 92 receives the signal. This would have extreme usefulness for nighttime telephone calls. Further, other static components rather than the triodes 26 and 66 might be utilized in accordance with the principles of the present invention. That is, semiconductor devices might be substituted in accordance with standard engineering practices for the triodes 26 and 66.

The present invention may be embodied in other specific forms without departing from the spirit or essential attributes thereof and, accordingly, reference should be made to the appended claims, rather than to the foregoing specification as indicating the scope of the invention.

I claim:

1. A telephone calling mechanism comprising a housing, a plurality of touch plates on said housing, a capacitance sensing means connected to each touch plate, a telephone signal utilization means, said capacitance sensing means being operative to transmit a signal to said telephone signal utilization means when a person touches a particular touch plate, said last-mentioned signal being indicative of said particular touch plate, individual indicating means associated with each of said touch plates, each particular indicating means being placed in an indicating state by said capacitive sensing means when a person touches the particular touch plate associated with said particular indicating means, said particular indicating means being dependent for return to its original state on transmittal of the signal associated with said particular touch plate to said telephone signal utilization means and independent of the time a person touches the particular touch plate.

2. The telephone calling mechanism of claim 1 wherein said individual indicating means are lamps placed below each of said touch plates within said housing, said touch plates being light transmittive so as to allow the illumination from said lamps to be seen from without said housing, each particular lamp being placed in an indicating state by said capacitance sensing means when a person touches the particular touch plate associated with said particular lamp, said lamp being intended for return to its original state on transmittal of the signal associated with said particular touch plate to said telephone signal utilization means and independent of the time a person touches the particular touch plate.

3. The telephone calling mechanism of claim 1 including electrical circuit isolating means, said electrical circuit isolating means being operative to isolate said capacitance sensing means from said telephone signal utilization means except when said capacitance sensing means is transmitting a signal to said telephone signal utilization means.

4. The telephone calling mechanism of claim 1 including a handpiece associated with said housing, said handpiece being removably mounted on said housing, and switching means, said switching means being operative upon removal of said handpiece from said housing to energize said capacitance sensing means.

5. The telephone calling mechanism of claim 1 wherein each of said touch plates includes an electrode, said capacitance sensing means includes an oscillator, said oscillator having a grid circuit connected to one of said electrodes, the application of body capacitance to said one electrode being operative to vary the grid circuit of said oscillator.

References Cited by the Examiner

UNITED STATES PATENTS

| | | | |
|---|---|---|---|
| 2,810,066 | 10/1957 | Green | 200—87 X |
| 3,184,554 | 5/1965 | Meacham et al. | 179—90.3 X |

OTHER REFERENCES

Goddard: IBM Technical Disclosure Bulletin, "Non-Mechanical Keyboard," April 1961, p. 31.

KATHLEEN H. CLAFFY, *Primary Examiner.*

S. J. BOR, *Assistant Examiner.*